(12) United States Patent
Inohara (10) Patent No.: US 7,082,547 B2
(45) Date of Patent: Jul. 25, 2006

(54) DATA SIGNAL PROCESSING METHOD AND DATA PROCESSOR IMPLEMENTING INDEPENDENT AND ASYNCHRONOUS SYSTEM AND DATA CLOCKS

(75) Inventor: Naoyuki Inohara, Tokyo (JP)

(73) Assignee: NEC Corporation (JP)

( * ) Notice: Subject to any disclaimer, the term of this patent is extended or adjusted under 35 U.S.C. 154(b) by 454 days.

(21) Appl. No.: 10/289,502

(22) Filed: Nov. 6, 2002

(65) Prior Publication Data

US 2003/0097604 A1    May 22, 2003

(30) Foreign Application Priority Data

Nov. 21, 2001  (JP) ............................. 2001-355695

(51) Int. Cl.
*G06F 1/04*  (2006.01)
*H04L 7/00*  (2006.01)

(52) U.S. Cl. ...................... 713/600; 709/248; 375/354

(58) Field of Classification Search ..................... None
See application file for complete search history.

(56) References Cited

U.S. PATENT DOCUMENTS 5,790,842 A * 8/1998 Charles et al. .............. 713/600
6,172,540 B1 * 1/2001 Gandhi ....................... 327/145

FOREIGN PATENT DOCUMENTS

| CN | 1185847 A | 6/1998 |
|---|---|---|
| EP | 0 258 650 | 7/1987 |
| EP | 0 412 267 | 6/1990 |
| EP | 0 505 781 | 3/1992 |
| JP | 58-079329 | 5/1983 |
| JP | 62-252236 | 11/1987 |
| JP | 09-128334 | 5/1997 |
| JP | 10-093543 | 4/1998 |
| JP | 2001-069125 | 3/2001 |
| WO | WO 98/592298 | 12/1998 |

OTHER PUBLICATIONS

Search Report from British Patent Office issued on British patent application No. 0226127.9 dated Jul. 17, 2003.
Office Action issued by Japanese Patent Office on May 11, 2004 relating to a corresponding Japanese patent application.
English translation of relevant parts of Japanese Office Action issued May 11, 2004 prepared by Lawyers' and Merchants Translation Bureau on Jun. 24, 2004.

* cited by examiner

*Primary Examiner*—Lynne H. Browne
*Assistant Examiner*—Anand B. Patel
(74) *Attorney, Agent, or Firm*—Ostrolenk, Faber, Gerb & Soffen, LLP (57) ABSTRACT

A data clock for use in data communication between the connected processors and a system clock for use in data processing within the own processor are made independent and asynchronous in clock rate and adjustment between the two clocks is performed by an enable creating unit. According to the data processing enable signal created by the two clocks, a timing of the data processing is controlled and the data is processed at a high speed by the system clock.

19 Claims, 8 Drawing Sheets

DATA SIGNAL PROCESSING METHOD AND DATA PROCESSOR IMPLEMENTING INDEPENDENT AND ASYNCHRONOUS SYSTEM AND DATA CLOCKS

BACKGROUNDS OF THE INVENTION

1. Field of the Invention

The present invention relates to a data processor and a digital signal processing method of data processing and data transmission in a system having a plurality of data processors connected 2. Description of the Related Art Hitherto, there are the following two digital signal processing methods in performing data transmission and data processing in a system connecting a plurality of data processors and systematically operating them. According to a first method, a synchronization clock for digital signal processing is distributed from a given clock source to all the data processors forming the system, to synchronize the respective processors to this clock, thereby performing the signal processing. According to a second method, in a system having the data processors cascaded (bead connection or cascade connection), the synchronization clock is superimposed on the transmission data, hence to send the above data from a processor in the prior stage to a processor in the posterior stage, and a synchronization clock is reproduced from the receive data in the posterior processor, thereby performing the signal processing based on the reproduced clock.

In a data processor of performing the data processing by using the above methods, an internal clock of one processor is phase synchronized with a synchronization clock distributed from the outside or a clock reproduced from the transmission data, and predetermined data processing is performed within that processor, according to this clock.

Therefore, it is necessary to fix a reference clock, which is used in each data processor in the above methods, at the same clock frequency, for synchronization among the processors, by using an oscillator of the same frequency in each processor, and in order to change the data speed, each processor needs to take an integer ratio of the reference clocks after synchronization of the processors.

Recently, although a communication speed is more improved according as the data amount increases, it is necessary to change the communication facilities (infrastructure) themselves in order to improve the basic communication speed, but this is not so easy. If using a standardized signal for communication, data transfer speed cannot be changed freely by a user and a maker.

On the other hand, it is much easier to increase the speed of an operation clock of the CPU performing the data processing than the basic communication speed and the CPU clock rate. Since those operation speeds are independent, it is necessary to separately provide an oscillator for an interface of data communication between connected processors and an oscillator for data processing CPU itself, and there is a restriction that the data communication and the data processing are permitted only at a predetermined clock frequency.

Hereinafter, in the specification, a clock used in the data communication between the connected processors will be referred to as "data clock" and a clock used in the data processing of the main body in a particular processor will be referred to as "system clock".

Figure 6:
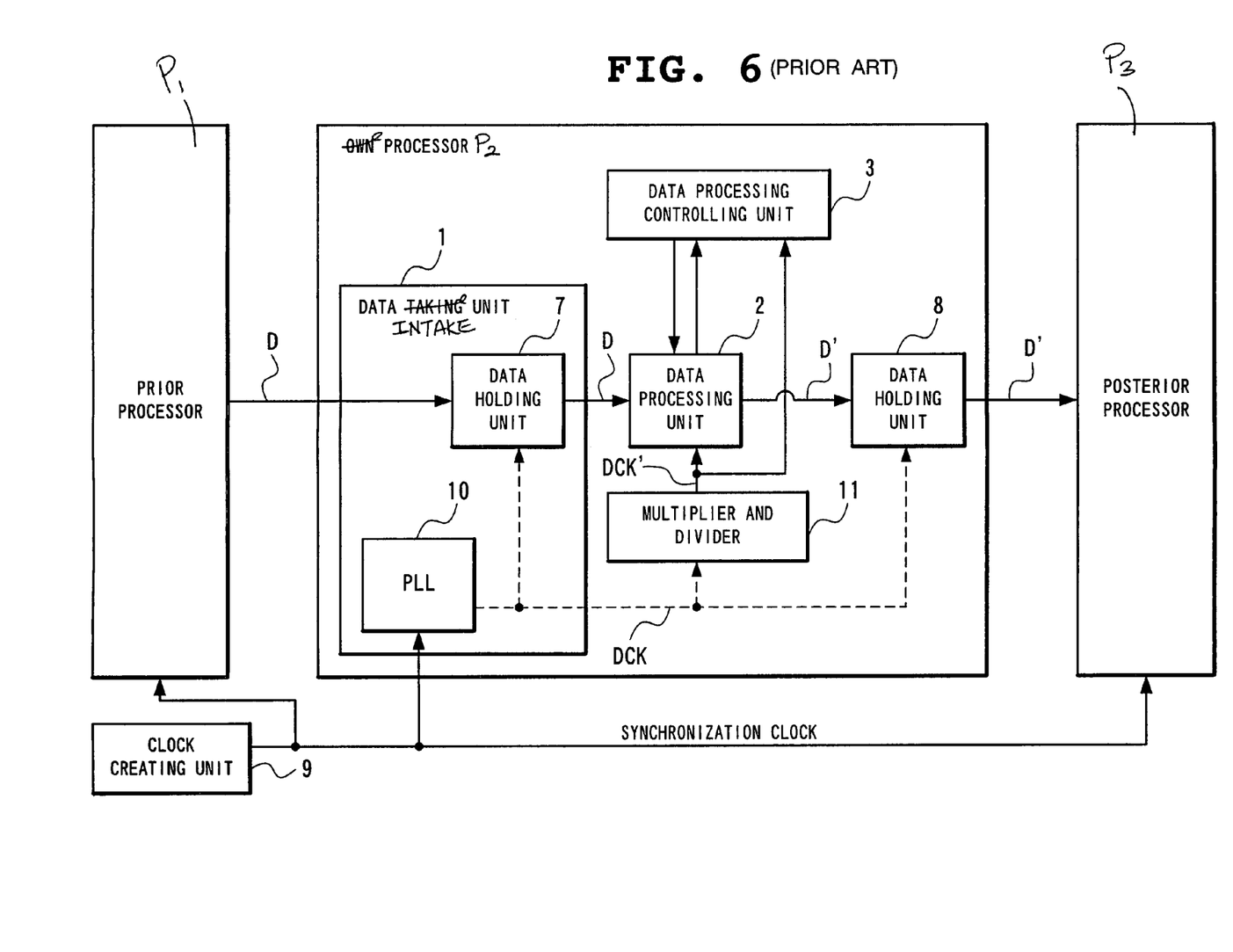
FIG. 6 is a view showing the structure of the conventional embodiment 1.
Figure 7:
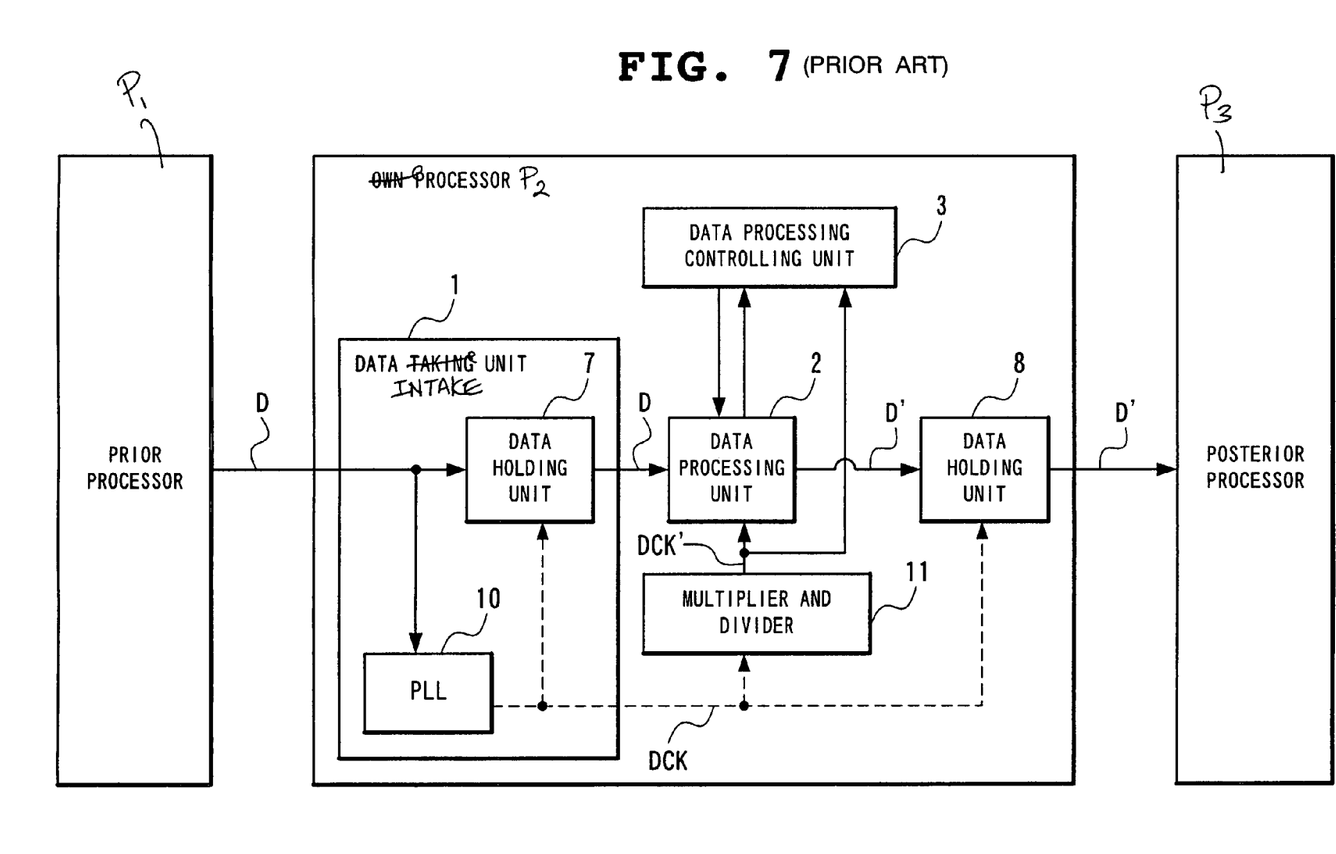
FIG. 7 is a view showing the structure of the conventional embodiment 2.

FIG. 6 and FIG. 7 shows the conventional system structure formed by the above-mentioned methods. FIG. 6 is a structural example of the method (conventional example 1) of receiving a synchronization clock from the outside. This method is used in case of using a signal format of the type incapable of reproducing a clock from the transmission data, like the NRZ (Non Return to Zero) signal method. A synchronization clock is distributed to the respective data processors $P_1$, $P_2$, $P_3$ from a clock creating unit 9 that is an external clock source. In the respective processors, a synchronization clock is supplied to a PLL (Phase Locked Loop) 10, and a clock created by an internal oscillator is phase-synchronized with it, hence to create and output a clock (data clock DCK) for use in the own processor. In the illustrated system, based on the clock, transmission data D is taken from a prior processor $P_1$, and ultimately transferred from processor $P_2$ to the posterior processor $P_3$. The data clock DCK is supplied to a data processing unit 2 and a data processing controlling unit 3 (DSP (Digital Signal Processor) and CPU performing the main processing within processor $P_2$) after multiplying and dividing the clock frequency (DCK') thereof depending on necessity in a multiplier and divider 11, hence to perform the data processing at the clock frequency.

In FIG. 6 and FIG. 7, DCK indicates a line of the data clock, DCK' indicates a line of the multiplied and divided data clock, D indicates a line of the transmission data, and D' indicates a line of the data processed by the data processing unit 2 and the data processing controlling unit 3 in processor $P_2$. A line from the data processing unit 2 to the data processing controlling unit 3 indicates the data given to the data processing controlling unit 3 or the information included in the data. A line from the data processing controlling unit 3 to the data processing unit 2 indicates the data calculated by the data processing controlling unit 3, control signal, or information.

FIG. 7 is a structural example in the method of reproducing a clock from the data with a synchronization clock superimposed there (conventional example 2). In this case, as a transmission coding method of the type capable of reproducing a clock from receive data, various methods including NRZI (Non Return to Zero, Inverted) method are used. In a data receiver 1, a clock is reproduced in the PLL 10 according to the received data from prior processor $P_1$ and processor $P_2$ is operated at the above clock or a clock multiplied and divided by the multiplier and divider 11 according to the above clock. When there is no received data, since there is no original data to be synchronized in the PLL 10, a clock in a free running state is used. In case of this method, one oscillator has only to be provided in the PLL 10 in order to do the data transmission and the data processing, and the oscillator can be formed at a low cost.

Figure 8:
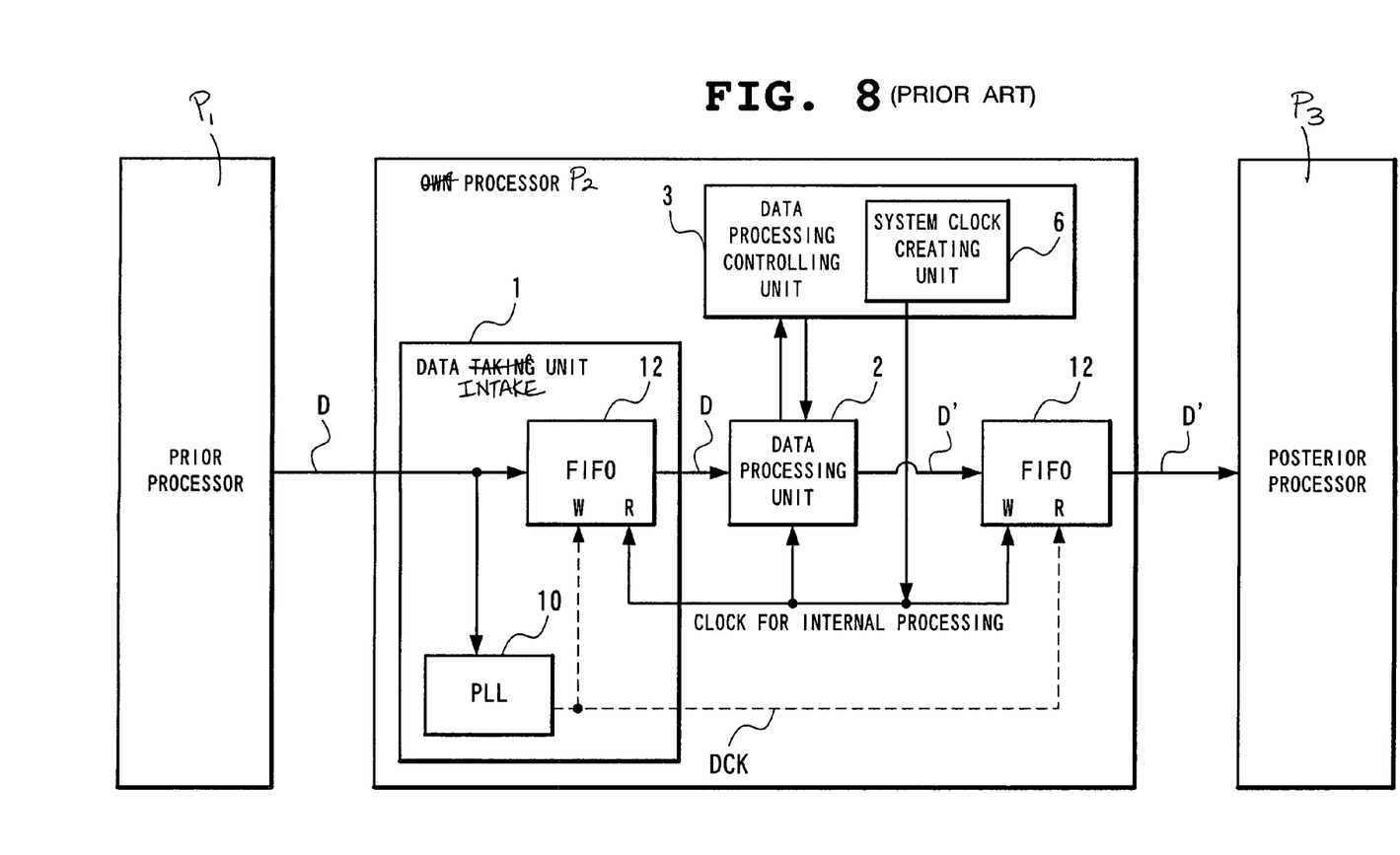
FIG. 8 is a view showing the structure of the conventional embodiment 3.

FIG. 8 shows an example (conventional example 3) formed by using a high speed clock different from a clock used in the data transmission (data clock), as a system clock used within the own processor, in order to speed up the operation within the own processor. In this system, a FIFO (First In First Out) memory 12 is used as the data input and output unit and the data processing is performed by using the system clock (the internal processing clock in FIG. 8). Clock exchange of the data is performed on the input data D and the processing data D from the prior stage $P_1$ and the processing data D' and the output data U toward the posterior stage $P_3$. At this time, data passing/passed may occur, or data shortage may occur. In order to control this, a state of the memory must be always monitored. When a memory capacity and a system clock are changed, a timing of control and setting must be changed. The memory control is performed by an empty flag, a half flag, and a full flag, as a unit attached to the LSI. A using state of the memory is confirmed by this flag and a separate circuit for counting the number of clocks is provided so to control the memory. When the data D has been stored into the FIFO memory 12 to some degree, it is read out at a stroke and processed, and the data, collected to an overflow avoidable degree, is written into the FIFO memory 12 at the output side.

SUMMARY OF THE INVENTION

In consideration to the above problem, the present invention is to provide a digital signal processing method and a data processor in which, in a system having a plurality of data processors connected for performing data communication and data processing, a data clock for use in the data communication between the connected processors and a system clock for use in the data processing within the processor are made independent and asynchronous in clock rate, and the system clock can be flexibly changed for speeding up the operation even if the data communication speed and the data clock are constant, or the system clock doesn't need to be changed even if the data communication speed and the data clock are changed.

According to one aspect of the invention, a digital signal processing method of data transmission and data processing in a system having a plurality of data processors connected, comprises the steps of making independent in clock rate, a data clock for use in data transmission between the data processors and a system clock for use in data processing within a particular data processor, and creating a data processing enable signal from the data clock being entered and the system clock within the particular processor, taking in transmission data from a prior processor, according to the data processing enable signal, and performing data processing on the taken data at a predetermined cycle number of the system clock, in the particular data processor.

In the preferred construction, the system clock is fixed at a clock rate much higher than the data clock.

In another preferred construction, the data processing enable signal is created by regarding a first one cycle of the system clock satisfying electric characteristic in one cycle of the data clock, as an enable signal, and the processing is suspended until the next enable signal is enabled after data processing of the data at the predetermined cycle number of the system clock.

According to another aspect of the invention, a data processor comprises data taking means i.e., an input unit for taking in transmission data from a prior processor while reproducing a clock after receiving a synchronization clock supplied from outside, and supplying the reproduced clock as a data clock, a system clock generator for creating a system clock, independent of the data clock, for use in data processing within the processor, a data processing unit for taking the data from the data input unit and performing the data processing on the data at a predetermined cycle number of the system clock, and an enable signal generator enabling and disabling data processing in the data processing unit after receiving the data clock and the system clock, wherein the data processing means takes in the data, according to the state of the enable signal.

In the preferred construction, the data processing performs the data processing at the predetermined cycle number of the system clock and thereafter suspends until the next enable signal.

In another preferred construction, the system clock is fixed at a clock rate much higher than the data clock.

In another preferred construction, the data processor further comprises a data processing controller, operating by the system clock, for controlling or performing the data processing through communication with the data processing unit.

In another preferred construction, the data processor further comprises a data holding circuit for receiving and holding the data processed in the data processing unit and supplying the data to a posterior processor in synchronization with the data clock.

According to a further aspect of the invention, a data processor comprises a data input unit for taking in data while reproducing a clock from transmission data supplied from a prior processor and supplying the reproduced clock as a data clock, system clock generator for creating a system clock, independent of the data clock, for use in data processing within the own processor, a data processing unit for taking the data from the data taking means and performing the data processing on the data at a predetermined cycle number of the system clock, and an enable signal generator enabling and disabling the data processing in the data processing unit after receiving the data clock and the system clock, and supplying the enable signal to the data input unit for the data processing, wherein the data processing unit takes in the data, according to the state of the enable signal supplied from the enable signal generator.

In the preferred construction, the data processing unit performs the data processing at the predetermined cycle number of the system clock and thereafter suspends until the next enable signal.

In another preferred construction, the system clock is fixed at a clock rate much higher than the data clock.

In another preferred construction, the data processor further comprises data processing controller, operating by the system clock, for controlling or performing the data processing through communication with the data processing unit.

In another preferred construction, the data processor further comprises data holding means for receiving and holding the data processed in the data processing unit and supplying the data to a posterior processor in synchronization with the data clock.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order not to unnecessarily obscure the present invention.

Figure 1:
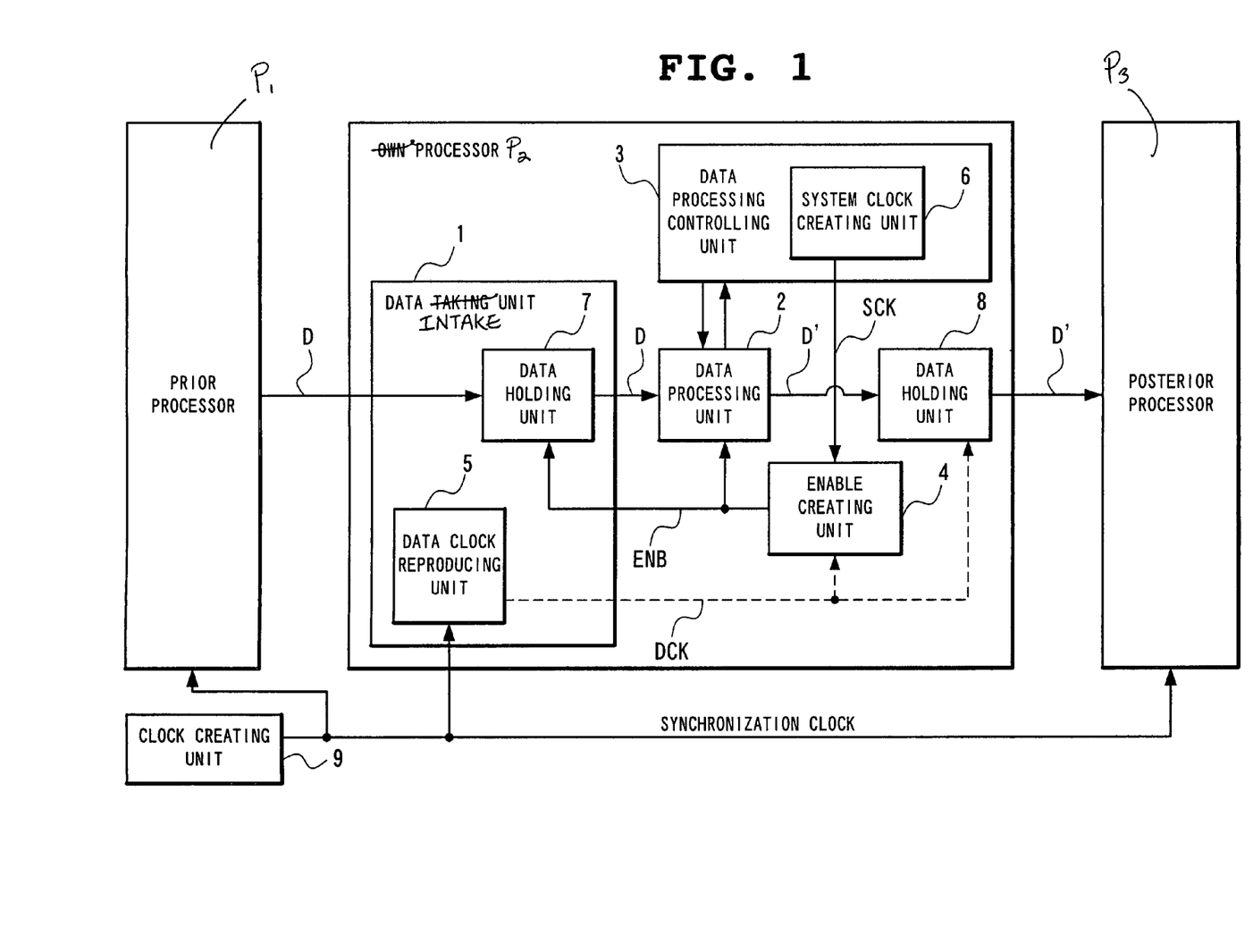
FIG. 1 is a view showing the structure of a method and a data processor (embodiment 1) according to an embodiment of the present invention.
Figure 2:
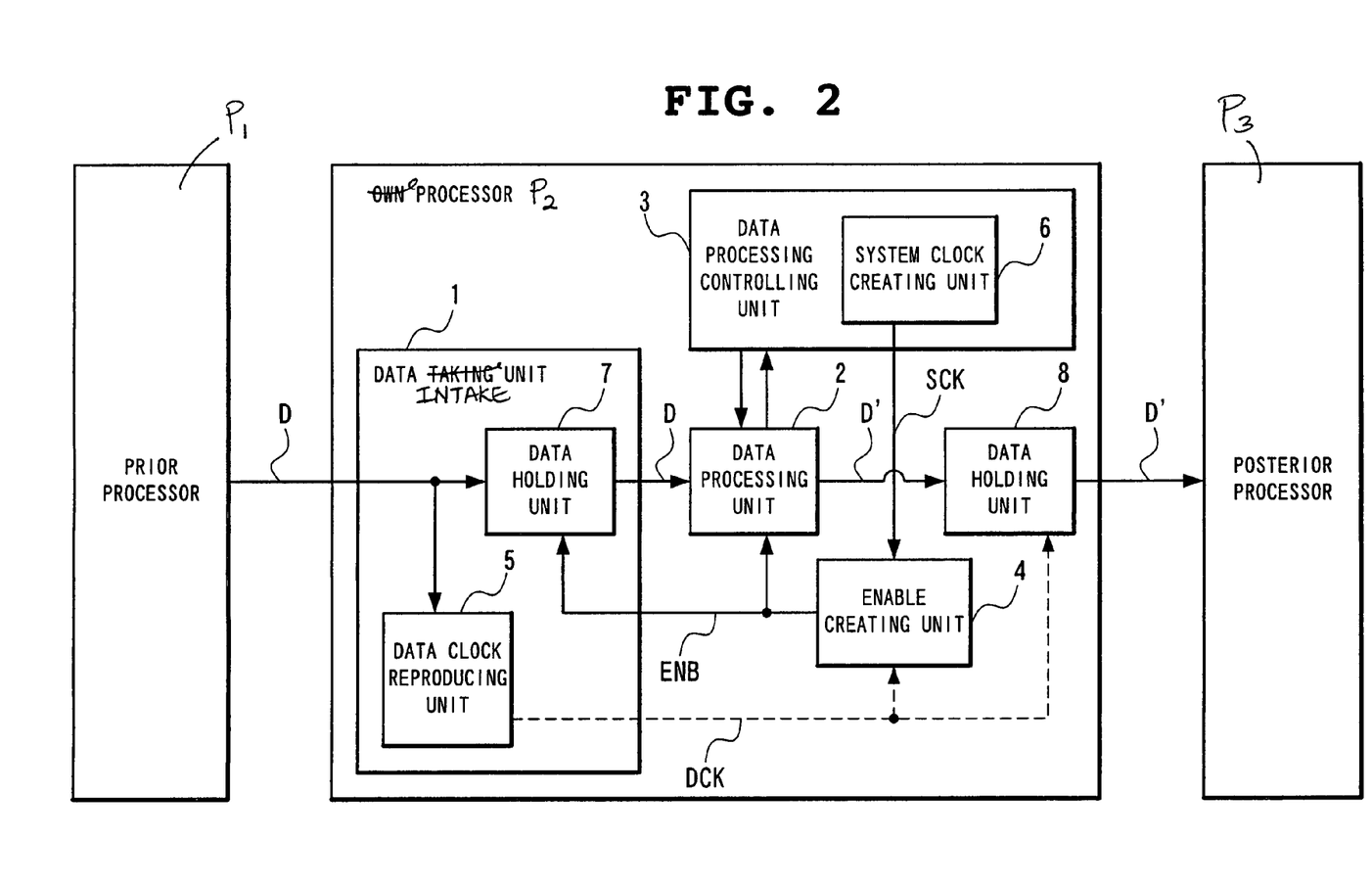
FIG. 2 is a view showing the structure of a method and a data processor (embodiment 2) according to another embodiment of the invention.

Hereinafter, a digital signal processing method and a data processor according to preferred embodiments of the present invention will be described in detail with reference to the accompanying drawings. FIG. 1 and FIG. 2 are views showing the structure of the digital signal processing method and the data processor corresponding to the method according to the embodiments of the invention. This method is a digital signal processing method in a system having a plurality of data processors connected for performing the data communication and the data processing of digital signal among the connected systems in a predetermined transmission method.

In this method, a data clock for use in an interface of the data communication between the connected processors and a system clock for use in the main processing (data processing) within a particular processor are made independent and asynchronous in clock rate (clock speed and clock frequency). It is to provide a simple structure of performing the data processing by speeding up the system clock several times faster than the data clock of comparatively low speed. Here, "independent" or "asynchronous" needs a condition that the system clock SCK should be faster than the data clock DCK or that the clock frequency of the system clock SCK should be larger than that of the data clock DCK, and further it means that the system clock SCK does not depend on the frequency, phase, level, jitter accuracy of the data clock DCK.

The system is formed by cascading two and more data processors, and in FIG. 1 and FIG. 2, a prior processor $P_1$, a subject processor $P_2$, and a posterior processor $P_3$ are connected in this order. The processor $P_2$ and the connected processors are connected by a suitable transmission medium and the data transmission is performed in a desired communication method. As for the data communication between the connected processors, a data clock rate used in the communication and a coding method are concerned with the invention, and the other factor is not restricted to the invention especially.

FIG. 1 shows the structure using the method of distributing a synchronization clock from the outside, corresponding to the above-mentioned conventional example 1, which is referred to as embodiment 1. FIG. 2 shows the structure using the method of reproducing a clock from the data, corresponding to the conventional example 2, which is referred to as embodiment 2. Although they are different in the synchronous communication method, the spirit of the invention is on a mechanism of adjustment between the data clock and the system clock, which can be applied to the both synchronous communication methods. In FIG. 1 and FIG. 2, since the components with the same numeral attached are modules having the same function, they will be described collectively.

Each line in FIG. 1 and FIG. 2 shows a physical signal line. The line D indicates the transmission data and the data to be processed in processor $P_2$, D' indicates the data processed in the data processing unit 2 of processor $P_2$ or the data which processor $P_2$ transmits to the posterior stage $P_3$, DCK indicates "data clock", SCK indicates "system clock", and ENB indicates "data processing enable signal".

The method and the data processor comprises a data taking or input unit 1, a data processing unit 2, a data processing controlling unit 3, and an enable creating unit 4. The data input unit 1 further includes a data clock reproducing unit 5 and a first data holding unit 7. The data processing controlling unit 3 includes a system clock creating unit 6. Further, as an interface to the posterior processor $P_3$, it includes a second holding unit 8. In the embodiment 1, there exists a clock creating unit 9 that is an external clock source, so to distribute a synchronization clock to the respective processors.

The data input unit 1 performs the processing of reproducing and supplying a data clock DCK after phase synchronization with an input clock or data, in the data clock reproducing unit 5 and the processing of taking the data D sent from the prior processor $P_1$ into the first data holding unit 7 according to a data processing enable signal ENB. In the embodiment 1, a synchronization clock supplied from the clock creating unit 9 is received so to obtain a data clock DCK for use in processor $P_2$. In the embodiment 2, a clock is reproduced from the input data D with the clock superimposed thereon, so to obtain a data clock DCK for use in processor $P_2$.

The data clock reproducing unit 5 includes a PLL (Phase Locked Loop: phase synchronizing circuit). The PLL supplies a signal phase-synchronized with an input signal by using the output of an internal oscillator. The data clock reproducing unit 5 reproduces the data clock DCK from the input signal and supplies it. The data clock DCK supplied from the data clock reproducing unit 5 is supplied to the enable creating unit 4 and the second data holding unit 8. The data clock DCK is directly used as a timing signal when the data taking unit 1 takes in the data D from the prior processor and the second data holding unit 8 supplies the data D to the posterior processor.

The first data holding unit at the input side and the second data holding unit at the output side are respectively formed by, for example, a D flip-flop and they receive and hold the data D or the data D'.

The data processing control unit 3, operating by the system clock SCK, is a controller such as a CPU or a DSP (Digital Signal Processor) for controlling processor $P_2$ with a predetermined control sequence. The data processing controlling unit 3 instructs the data processing unit 2 about the processing method of the data D and performs the calculating processing on the data D.

The system clock creating unit 6 is a circuit for creating a system clock SCK for use in the main processing of processor $P_2$ in the data processing controlling unit 3 and the data processing in the data processing unit 2, according to the oscillator such as a quartz resonator. The system clock SCK, having a clock rate larger than the data clock DCK used for the data communication between the connected processors, is a clock independent of the data clock DCK and asynchronous to it. The system clock SCK is supplied also to the enable creating unit 4.

The data processing unit 2 is a unit for processing the received data D from the prior processor (data processing) and processing the transmission data toward the posterior processor $P_3$, which is formed by the pure hardware or the software processing by the CPU or DSP. In the data processing unit 2, the data D is received from the first data holding unit 7 according to the enable signal ENB and the data is processed at a predetermined cycle number of the system clock SCK. Within one cycle of the data clock DCK, the data is processed by the system clock SCK at its predetermined cycle number.

The maximum cycle number of the system clock SCK capable of data processing per a data clock DCK is determined by the ratio of the two clock frequencies. Namely, when the ratio of the clock frequency between the data clock DCK and the system clock SCK is 1:10, ten times of calculation processing at the maximum can be performed within one cycle of the data clock. When the clock rate of the data clock DCK is given as the information, the above data processing cycle number can be set with the system clock SCK variable.

The data processing on the data D in the data processing unit 2 is started at a timing when the data processing enable signal ENB supplied from the enable creating unit 4 becomes H (=enable) and performed at the predetermined clock cycle number of the system clock SCK during the period from H to H of the enable signal ENB. After data processing by the system clock SCK, the processing will be suspended until the next H timing of the enable signal ENB, thereby saving the power consumption.

In the data processing unit 2, the processing depending on the application purpose, for example, the adding processing of a CRC signal and the decoding processing, or the error correction and the playback of the sound data, is performed as the data processing. The invention provides a simple structure capable of performing the data processing with the speedy system clock SCK independent of the data clock DCK.

There are some ways in the communication and the data processing between the data processing unit 2 and the data processing controlling unit 3. For example, the data processing controlling unit 3 supplies the system clock SCK to the data processing unit 2 so that it can process the data D by the same clock. As for some instructions, control signals are exchanged therebetween. As another way, the data processing controlling unit 3 may take out the data D from the data processing unit 2, so to process the data D by the system clock SCK and return the processed data D' to the data processing unit 2. As further another way, a control signal may be created by the data processing controlling unit 3 based on the information included in the data D and the control signal may be used in order to control the data processing unit 2.

The enable creating unit 4 is a circuit for receiving the data clock DCK supplied from the data clock reproducing unit 5 and the system clock SCK supplied from the system clock creating unit 6, creating a data processing enable signal ENB after adjustment of the timing between the two clocks, and supplying the above signal to the first data holding unit 7 at the input side and the data processing unit 2 respectively. The data processing enable signal ENB is a signal for taking the data D into the first data holding unit 7 and enabling or disabling the data processing of the data D with the system clock SCK by the data processing unit 2 and the data processing controlling unit 3.

More specifically, the input data D is taken into the first data holding unit 7 at the rising edge of the system clock SCK when the data processing enable signal ENB is at H level (=enable). The data D taken into the first data holding unit 7 is processed with the system clock SCK by the data processing unit 2 and the data processing controlling unit 3 (described later).

In the embodiments 1 and 2, the interface by using the data clock DCK is used also when transmitting the data D' (the data D which has been processed by the data processing unit 2 and the data processing controlling unit 3) to the posterior processor $P_3$. In the interfaces to the prior processor $P_1$ and the posterior processor $P_3$, a difference in a communication algorithm and a signal format and the other difference do not matter as long as the clock rate and the communication time are identical.

Figure 3:
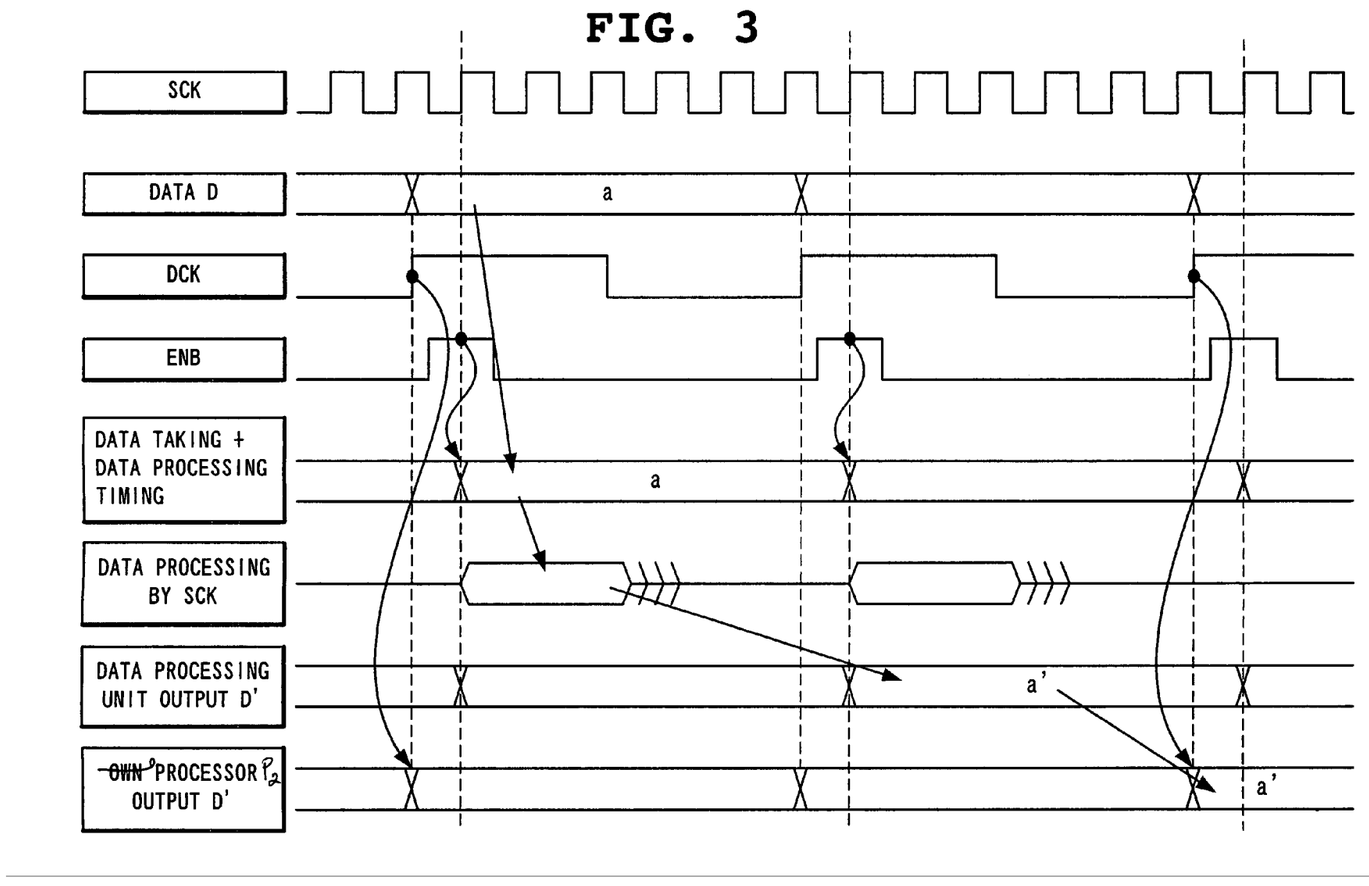
FIG. 3 is a timing chart showing the operation of the method and the data processor according to the embodiment of the invention.

FIG. 3 is a timing chart showing the operation of the digital signal processing method and the data processor according to the embodiments of the invention (embodiments 1 and 2). The signals indicate, from the top, the system clock SCK, the transmission data D from the prior processor, the data clock DCK, the data processing enable signal ENB (enable signal as for the data processing and the taking-in processing of the data D), the timing of the data processing and the taking-in processing of the data D, the data processing of the data D by the system clock SCK in the data processing unit 2, the output data D' from the data processing unit 2, and the output data D' from the own processor.

A flow of the processing will be described. At first, in the data clock reproducing unit 5, a synchronization clock from the outside is received so as to obtain the data clock DCK, in the case of the first embodiment. In the case of the second embodiment, the data clock DCK is reproduced from the input data D. In the data taking unit 1, the data D is supplied to the first data holding unit 7 in accordance with the data clock DCK.

The data clock DCK and the system clock SCK are supplied to the enable creating unit 4, where the data processing enable signal ENB is created and supplied to the first data holding unit 7 and the data processing unit 2.

The input data D is taken into the first data holding unit 7 at the rising edge of the system clock SCK when the data processing enable signal ENB is at the H level, and the data is processed at a high speed at the predetermined cycle number of the system clock SCK by the data processing unit 2 and the data processing controlling unit 3.

In the enable creating unit 4, as a way of creating an enable signal ENB, for example, one clock cycle of the system clock SCK first satisfying the electric characteristic after the data clock DCK rises up to the H level is regarded as the H of the enable signal ENB. The while when the enable signal ENB is at H is regarded as a timing capable of starting the data processing and the taking-in processing of the data D in the data processing unit 2.

The data D taken in by the data processing unit 2 is processed at a high speed by use of the system clock SCK, by the data processing controlling unit 3, according to the clock number of the system clock SCK per one cycle of the data clock DCK, which number is regarded as the suitable setting for the data processing. After the data processing, the data processing unit 2 suspends the data processing until receiving the next enable signal ENB (it becomes the H level), thereby saving the power consumption.

The data D' processed in the data processing unit 2 (or the data transmitted from the data processing controlling unit 3 of the processor $P_2$ to the posterior processor $P_3$) is supplied to the second data holding unit 8, and read out by the data clock DCK, and thus the data D' is outputted to the posterior processor $P_3$ through the second data holding unit 8.

Figure 4:
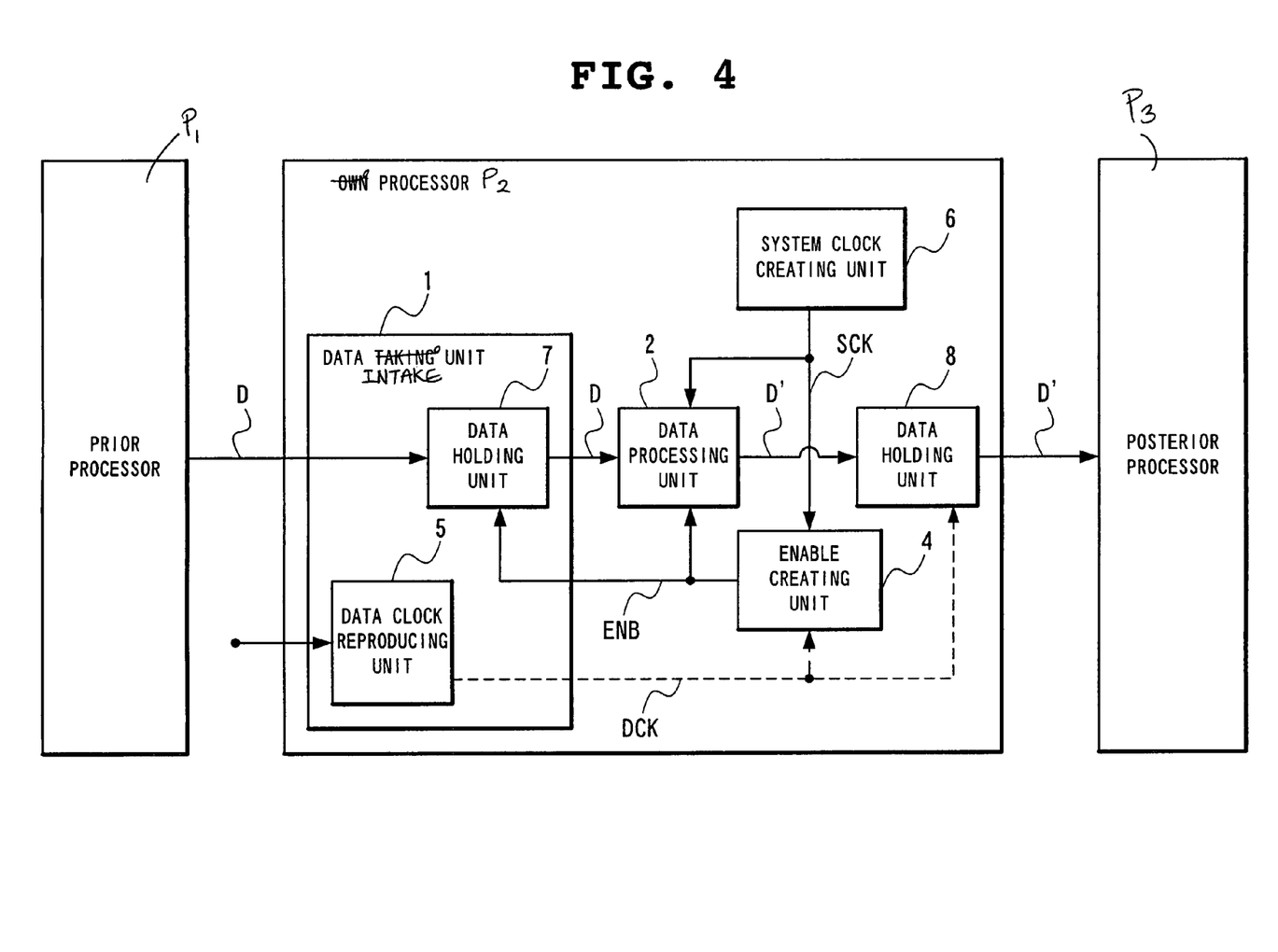
FIG. 4 is a view showing the structure of the method and the data processor (embodiment 3) according to the embodiment of the invention.

In the structure of the above embodiments, the structure without the data processing controlling unit 3 (namely, the data processing of the data D is performed by only the data processing unit 2) may be considered (embodiment 3 in FIG. 4). This is in the case, for example, where the input data D is always effective data and the predetermined constant processing is performed in the data processing unit 2. In this case, as the output destination of the processed data D, there exists an interface to the posterior processor $P_3$.

Figure 5:
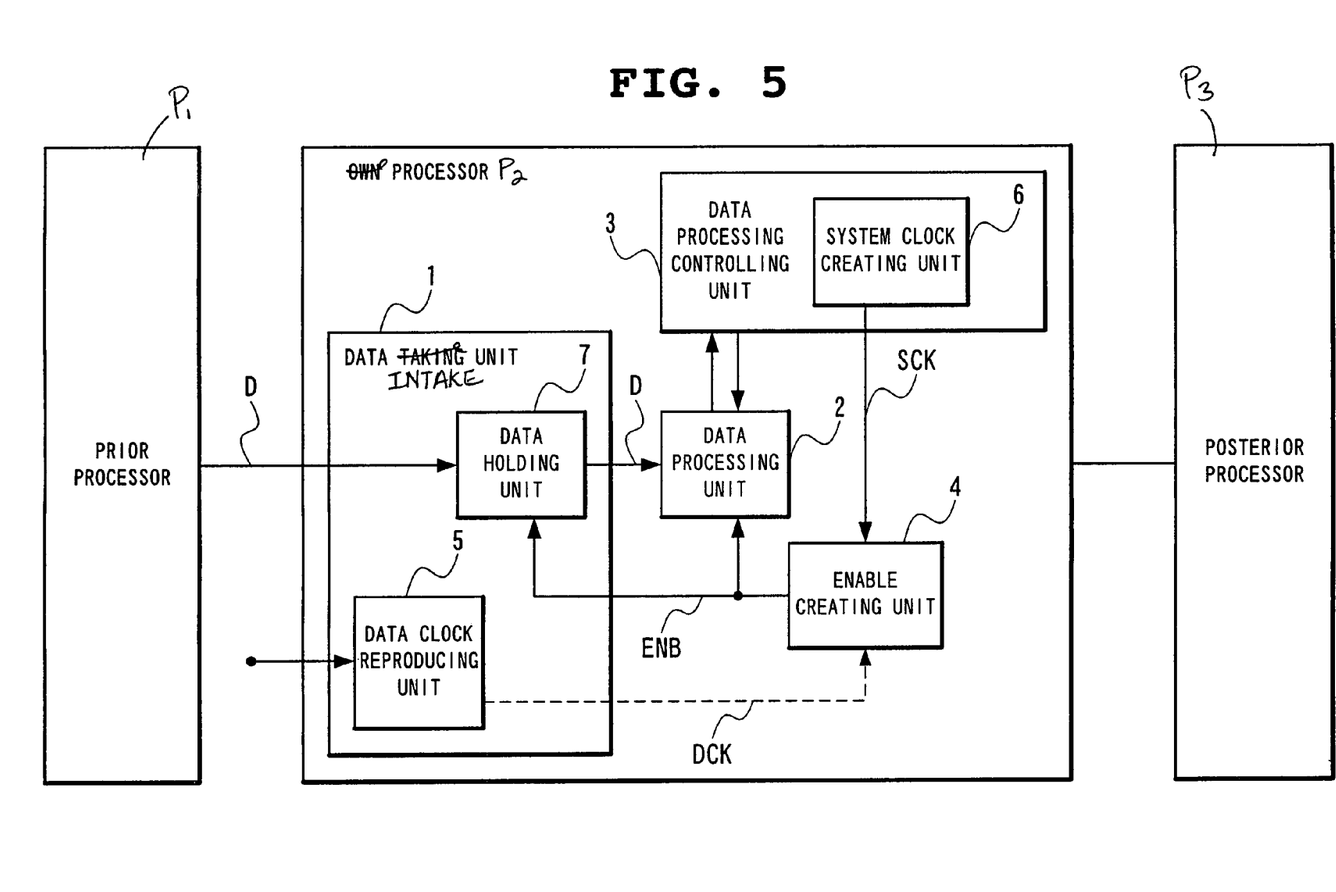
FIG. 5 is a view showing the structure of the method and the data processor (embodiment 4) according to the embodiment of the invention.

Further, the structure without the second data holding unit 8 for supply to the posterior processor $P_3$ may be considered (embodiment 4 in FIG. 5). This is in the case, for example, where there exists the data processing controlling unit 3, the necessary information has been taken out from the input data D and exhausted in processor $P_2$, and therefore the data is not transmitted to the posterior processor $P_3$. Alternatively, this is in the case where even if there exists a posterior processor $P_3$, the data D is transmitted there at the data cycle indifferent to the data clock DCK input in processor $P_2$.

According to the above structure and operation, it is possible to speed up the data processing by changing the clock rate of the system clock SCK of processor $P_2$, without changing the interface specification for the respective connected processors. This is because the data clock DCK and the system clock SCK are designed to operate independently and asynchronously. As an application of the method and the data processor of the invention, its application to various systems such as an AV system may be considered.

As mentioned above, the embodiments of the invention have been described. The above-mentioned embodiments are to show only some preferred embodiments of the invention and the invention is not restricted to the above, but various modifications are possible without departing from the spirit of the invention.

As set forth hereinabove, according to the invention, in a system having a plurality of data processors connected for performing a digital data communication and data processing, the use of the external clock (data clock) is restricted to the communication interface between the connected processors, the data processing within the processor is made independent by using the internal clock of the clock rate several times faster than the data transmission rate between the connected processors (based on the data clock), and the timing between the two clocks is adjusted by using the enable signal created by the ENB creating unit, thereby speeding up the data processing within the-own processor $P_2$ while changing the rate of the internal clock without changing the interface specification between the connected processors.

In the data processor, when a user wants to change the operation speed of the internal clock, the change becomes easy since it is independent of the external clock (data clock) used in the data communication between the connected processors.

When the data speed (data rate) varies temporally in the data communication between the connected processors (for example, in an instant the clock rate varies from 1 Mbps to 2 Mbps), the PLL follows the speed or the frequency of the data clock is given as the information, resulting into a state of reproducing the input data and the data clock. If the change of the data speed (data rate) is within the range capable of getting the cycle number of the system clock necessary for the data processing in one cycle of the data clock, the data processing is possible at the same system clock without any special control. The number of the system clock cycle per one cycle of the data clock is defined by the cycle of the enable signal ENB. At this time, the data clock as for the input data is defined as at the relatively same timing (namely, there never occurs the case where the data is the data of 1 MHz cycle but the clock is 3 MHz).

Compared with the above-mentioned conventional example 3, in the invention, a complicated memory control is not necessary if it is found how many cycle number of the system clock can be used per one clock cycle of the data clock, and further a complicated control of data amount is not necessary if the data is taken in and processed by the data processing unit 2 every time the data processing enable signal ENB becomes H and it is supplied from the data processing unit 2 before the next enable signal ENB becomes H.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A method of digital signal data transmission and data processing in a system having a plurality of data processors connected in a sequence by a communication medium, comprising the steps of:
   providing a synchronization signal for the system;
   generating data clock signals from the synchronization signal for use in data transmission through the medium from one data processor to the next in the sequence;
   generating respective system clock signals for use in data processing within each of the plurality of data processors,
   the data clock signals and the system clock signals being independent of each other in clock rate;
   creating data processing enable signals from said data clock signals and said respective system clock signals within each processor;
   transferring data from one data processor to a subsequent data processor in the sequence under control of said data clock signals; and
   performing data processing on received data at predetermined cycles of the system clock signals.

2. The digital signal processing method as set forth in claim 1, wherein said system clock is fixed at a clock rate much higher than said data clock.

3. The digital signal processing method as set forth in claim 1, wherein said data processing enable signal is created by regarding a first cycle of said system clock satisfying a specific electric characteristic in a cycle of said data clock, as an enable signal, and the processing is suspended until the next enable signal after data processing of the data at the predetermined cycle number of said system clock.

4. A data processor comprising:

a data intake unit for receiving data transmitted from another data processor connected thereto by a communication medium;

a data clock generating unit responsive to an incoming synchronization clock to generate a data clock, wherein the synchronization clock is used by a plurality of data processors which receive and transmit data from one to another in a sequence through the communication medium;

a system clock generating unit for creating a system clock independent of the data clock, for use in data processing within the processor;

a data processing unit which receives data from said data intake unit and performs data processing on the received data at predetermined cycles of said system clock; and an enable signal creating unit responsive to said data clock and said system clock which creates an enable signal for enabling and disabling data processing in said data processing unit, wherein said intake unit is operative to take in received data, according to the state of the enable signal.

5. The data processor as set forth in claim 4, wherein said data processing unit performs the data processing at the predetermined cycle number of said system clock and thereafter suspends processing until the next enable signal.

6. The data processor as set forth in claim 4, wherein said system clock is fixed at a clock rate much higher than said data clock.

7. The data processor as set forth in claim 4, further comprising a data processing controlling unit operating by said system clock for controlling or performing the data processing through communication with said data processing unit.

8. The data processor as set forth in claim 4, further comprising a data holding unit which receives and holds data processed in said data processing unit and supplies the data to a posterior processor in synchronization with said data clock.

9. The data processor as set forth in claim 4, wherein the synchronization clock is derived from the transmitted data.

10. The data processor as set forth in claim 9, wherein said data processing unit performs the data processing at the predetermined cycle number of said system clock and thereafter suspends processing until the next enable signal.

11. The data processor as set forth in claim 9, wherein said system clock is fixed at a clock rate much higher than said data clock.

12. The data processor as set forth in claim 9, further comprising a data processing controlling unit operating by the system clock for controlling or performing the data processing through communication with said data processing means.

13. The data processor as set forth in claim 9, further comprising a data holding unit for receiving and holding the data processed in said data processing means and supplying the data to a posterior processor in synchronization with said data clock.

14. The data processor as set forth in claim 4, wherein the synchronization clock is supplied separately from the transmitted data.

15. The data processor as set forth in claim 14, wherein said data processing unit performs the data processing at the predetermined cycle number of said system clock and thereafter suspends processing until the next enable signal.

16. The data processor as set forth in claim 14, wherein said system clock is fixed at a clock rate much higher than said data clock.

17. The data processor as set forth in claim 14, further comprising:

a data processing controlling unit operating by said system clock for controlling or performing the data processing through communication with said data processing unit.

18. The data processor as set forth in claim 14, further comprising a data holding unit which receives and holds data processed in said data processing unit and supplies the data to a posterior processor in synchronization with said data clock.

19. A data processor as set forth in claim 4, wherein said data processing unit is operative to receive data according to the state of the enable signal.

* * * * *